2,852,564
Patented Sept. 16, 1958

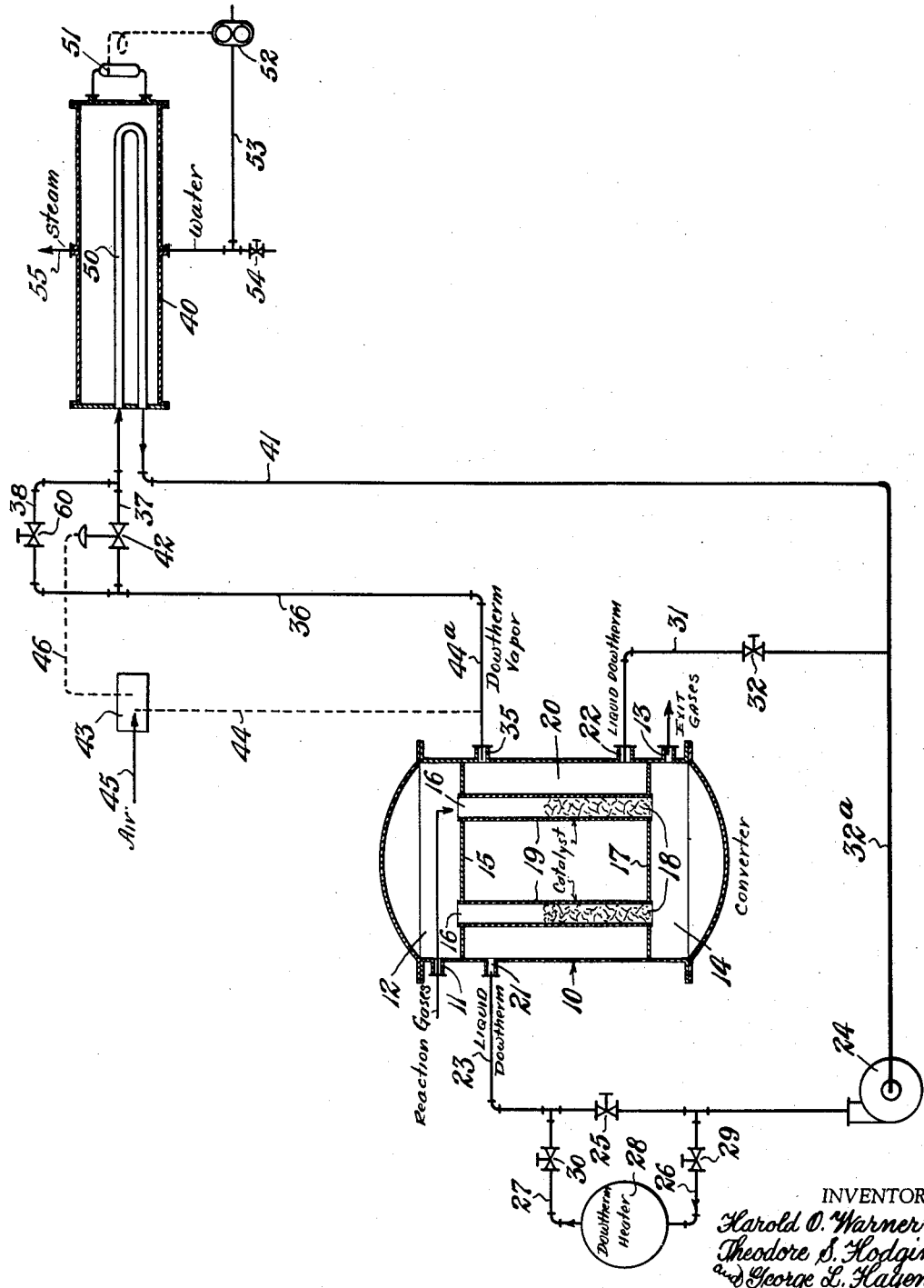

2,852,564

PROCESS FOR CONTROLLING REACTION TEMPERATURE IN VAPOR PHASE OXIDATION OF ALCOHOLS TO ALDEHYDES

Harold O. Warner, Mercer Island, and Theodore S. Hodgins and George L. Hagen, Seattle, Wash., assignors to Reichhold Chemicals, Inc., Detroit, Mich.

Application January 21, 1955, Serial No. 483,274

2 Claims. (Cl. 260—603)

This invention relates to a system particularly designed for use in the vapor phase oxidation of alcohols to aldehydes, which system provides for the control of the transfer of exothermic heat from a fluid chemical reaction conducted at elevated temperatures where the exothermic heat is transferred to a high boiling non-aqueous heat transfer fluid separated from the fluid reactants by a metal or other barrier and which provides a degree of precise temperature control hitherto unobtainable. A suitable high-boiling non-aqueous heat transfer fluid is one containing diphenyl or a mixture of diphenyl and diphenyl oxide such as Dowtherm, which is an available commercial product of Dow Chemical Company comprising an eutectic mixture of diphenyl and diphenyl oxide. The properties of Dowtherm as set forth in the Condensed Chemical Dictionary, 5th edition, Reinhold Publishing Corporation, are as follows: colorless, non-corrosive liquid which is stable up to 725° F.; sp. gr. 1.060 (25/25° C.); B. P. 258° C.; F. P. 12° C.; specific heat 0.63 B. t. u./lb./° F. at B. P.; heat of evaporation 123 B. t. u./lb. at B. P.; soluble in all proportions in alcohol, carbon tetrachloride, and ether (25° C.); insoluble in water. The uses are set forth as follows: As a heat transfer medium in generating and superheating steam, in central heating plants with a distributing system to various pieces of process equipment, in individual heating and cooling units for chemical reactors, in heat-storage systems for use in off-peak periods, in jacketed reactors and kettles, and in high-temperature dryers.

It is well known to control the temperature on a two-phase heat transfer medium contained in a closed system by changing the pressure on the heat transfer medium. The change in pressure has been conventionally accomplished by the use of vacuum or the applied pressure from a separate source of high pressure inert gas.

When such a system is at equilibrium the same single pressure exists on all of the liquid phase heat transfer medium and all of the gaseous phase heat transfer medium. Our process and apparatus differ from the prior art in providing a control over the pressure of the vapor phase so that a differential pressure exists between the vapor partially surrounding a catalyst chamber from which the exothermic heat is to be withdrawn and the condenser system which condenses the heat transfer medium vapor and removes heat from the whole system. The condensed heat transfer medium is then returned to the heat transfer medium surrounding the catalyst chamber.

Particularly this process and apparatus are well adapted to control the catalytic vapor phase oxidation of alcohols to aldehydes, and specifically to the oxidation of methanol to formaldehyde.

Specifically our invention comprises a method for controlling the transfer of exothermic heat from a catalyst bed which comprises surrounding the catalyst tubes in a reactor with a boiling liquid heat exchange medium and continuously pumping said liquid past the catalyst tubes at such a rate as to provide substantially liquid film heat transfer coefficients in the transfer of heat from the catalyst tube to the liquid and simultaneously allowing the vapor from said liquid heat exchange medium to pass through a control valve prior to entering a condensing zone by means of said control valve and returning the condensate through a pressure leg to a liquid circulatory system.

In copending applications Serial Numbers 452,684 and 452,685, filed August 27, 1954, now U. S. Patents Numbers 2,812,309 and 2,812,308, are described suitable catalysts and processes for the production of formaldehyde from methanol. It is highly desirable in carrying out these processes that the exothermic heat of reaction be under careful control at all times to avoid the development of high local reaction temperatures which destroy the expensive catalyst by fusing the catalyst particles and generating in some cases explosive conditions within the reactor.

A number of systems have been proposed to control the release of exothermic heat such as are described, for example, in U. S. Patents Nos. 1,604,739 and 2,081,120. We have found these systems and others unsatisfactory for our use because of local overheating of the catalyst and general sluggishness of operation of the prior systems.

In U. S. Patent No. 2,081,120 temperature control is maintained by varying the pressure of an inert gas on the system which varies the boiling point of the liquid heat exchange medium. In the event that excess process heat is developed by local excess catalysis if the process of U. S. Patent No. 2,081,120 is used, temperature control is effected by venting the inert gas to the atmosphere and the vapor from the expensive heat exchange medium is simultaneously lost to the atmosphere, with the possibility of hot flammable and toxic heat exchange medium being sprayed over operating personnel and equipment. This is highly undesirable not only from the standpoint of plant safety but also because of the resulting economic loss.

Our invention is an improvement upon the process described in U. S. Patent No. 1,604,739 in that continuous circulation of the liquid heat control medium is maintained past the reactor tubes, the vapor from the heat control medium passing through a control valve and then a condenser which is operated completely flooded at all times, the cooled condensate returning through a leg of sufficient height to provide sufficient pressure differential to cause natural circulation in the event of pump failure, said condensate being intimately mixed with the external circulating liquid heat transfer medium prior to return to the reactor. By circulation of the heat transfer medium localized overheating is avoided and the overall rate of heat transfer is increased, thus providing close temperature control. By providing a control valve in the vapor line prior to the condenser, any temperature up to the temperature of decomposition of the heat transfer medium may be obtained. Since no noncondensible gases are present in the system operation under vacuum may take place and temperatures below the atmospheric boiling temperature of the heat transfer medium may be obtained.

We have found that where diphenyl is used as the heat transfer medium surrounding the catalyst tubes in a methanol to formaldehyde converter the simple boiling of the diphenyl caused by transfer of exothermic heat from the catalyst tubes is not sufficient to adequately agitate the bulk of the diphenyl and provide uniform temperature throughout. As is well known, in catalytic vapor phase oxidation a pronounced difference in temperature of anywhere between 50 to 500° F. or more may occur between the reaction zone and the catalyst in other parts of the catalyst tube. The reaction zone may extend for only a short distance, sometimes less than one inch in length. The exothermic heat is largely released at this point and this is also the point where the maximum heat transfer to the cooler diphenyl on the outside of the catalyst tubes takes place. The net result is that the heat transfer has to take place through a diphenyl vapor film due to the boiling of the diphenyl. As is well known, the coefficient of heat transfer for a vapor film is lower than for a moving liquid film. Where heat transfer has to take place through a vapor film a greater temperature differential exists between the temperature of the reaction zone in the actalyst tubes and the heat transfer medium. The net result is that the temperature of the reaction zone is undesirably high, and loss in yield, decrease in quality of product, and shortening of catalyst life occurs.

We have overcome this difficulty by providing a positive movement of the liquid diphenyl past the catalyst tubes so as to insure a liquid film on the exterior of the catalyst tubes, as distinguished from a vapor film which characterized previous systems as shown in U. S. Patents Nos. 1,604,739 and 2,081,120. We accomplish this by pumping diphenyl in an external circuit from the catalytic reactor and the condenser system. In maintaining control over the transfer of exothermic heat from the catalytic oxidation of methanol to formaldehyde we have found that it is necessary to pump the diphenyl at such a rate that the mass of diphenyl surrounding the catalyst tubes is changed at least once every ten minutes.

The diphenyl vapor entering the condenser system is regulated by a control valve just ahead of the condenser. This control valve is itself automatically controlled from a position of 5% open to 100% open by an automatic pressure controller actuated by the pressure of the diphenyl in the catalytic reactor. A satisfactory sensitivity in control is obtained when a five pound change from twenty-five pounds per square inch to thirty pounds per square inch in the vapor pressure of the diphenyl in the catalytic reactor causes the control valve to open to the full open position.

The condenser system operates only to remove slightly more than the latent heat of vaporization of the diphenyl. This is an important feature of our process since the diphenyl is not excessively cooled in the condenser and the diphenyl coming in contact with the catalyst tubes does not vary widely in temperature. This greatly aids in control of temperature since a relatively large volume of diphenyl only minutely lower in temperature as compared to the temperature on the outside of the catalyst tubes is circulated to remove the exothermic heat from said tubes.

It is important that the condenser be located above the level of the liquid diphenyl in the catalytic reactor since the height of the liquid leg determines the maximum differential pressure between the diphenyl vapor in the catalytic reactor and the diphenyl vapor in the condenser. For most installations a differential pressure of not over five pounds provides satisfactory sensitivity in heat control.

The invention will be more readily understood by reference to a specific embodiment comprising a system designed for the production of aldehydes, particularly formaldehyde, by the catalytic oxidation of alcohols, particularly methanol, and employing a Dowtherm fluid and catalyst tubes containing a suitable catalyst forming the catalyst bed.

The accompanying drawing is a diagrammatic showing of a plant embodying our invention designed for the production of formaldehyde by catalytic oxidation of methanol using Dowtherm as the fluid transfer medium.

Referring in detail to the drawing, reference numeral 10 denotes a suitable converter provided with an inlet 11 to an upper chamber 12, through which inlet reaction gases comprising a mixture of air and methanol vapor are supplied to the converter. Near the bottom of the converter there is provided an outlet 13 from a lower chamber 14 for the reaction products in gaseous form. The upper chamber 12 is provided with a closure plate 15 having openings 16 therein, and similarly lower chamber 14 is provided with a plate 17 having openings 18 therein. The sets of openings 16 and 18 are connected by catalyst tubes 19, 19 passing through an intermediate chamber 20, and such tubes are filled with a suitable oxidation catalyst which may be of the type disclosed in applications Serial Nos. 452,684 and 452,685, filed August 27, 1954. The air and methanol vapor supplied to the inlet 11 may be preheated and the exit gases treated in accordance with the disclosures of the above applications.

The intermediate chamber 20 is provided with an upper inlet 21 and a lower outlet 22 for liquid Dowtherm. Dowtherm liquid may be supplied to inlet 21 through a line 23 by means of a suitable pump 24. The line between pump 24 and inlet 21 may be provided with a suitable manually operated control valve 25 and a by-pass 26, 27 is shown including a Dowtherm heater 28, which bypass is equipped with suitable control valves 29 and 30 so that fluid may be circulated through the bypass for supplying the desired quantity of heat to the fluid, or may be passed directly through the valve 25 to line 23 and thence to inlet 21, depending on the heat requirements.

The Dowtherm liquid outlet 22 is shown connected by line 31 containing a manually operated valve 32 with a line 32$^a$ which communicates with the pump 24 which returns the fluid to the converter.

The upper part of the intermediate Dowtherm chamber 20 is provided with an outlet 35 for Dowtherm vapor which passes upwardly through vapor line 36 and thence through one of a pair of parallel pipes 37 or 38 to a water cooled Dowtherm condenser 40, located at a level above the reactor or converter 10, from which condenser condensed vapor in liquid phase is returned through pipe 41 to the line 32$^a$ which leads to the circulating pump 24. The return line 32$^a$ is enlarged to prevent vapor lock in the pump due to flash vaporization in the lines.

In accordance with our invention the line 37 leading from the upright vapor line 36 to the condenser 40 contains a diaphragm valve 42 operated by pressure changes and controlled by a suitable instrument 43 connected through line 44 to a portion 44$^a$ of the vapor line 36, said instrument being operated by air pressure supplied at 45. From the instrument 43 an actuating pressure transmission line 46 leads to the diaphragm valve 42. The line 38 is shown as equipped with a manual valve 60 and comprises an optional bypass connection between line 36 and the condenser 40.

As shown, the Dowtherm condenser 40 is water cooled and is provided with hairpin tubes 50 for stress elimination. The water level within the condenser is maintained by means of a liquid level controller 51 which controls pump 52 having a return line 53 in which may be located a suitable control valve 54.

In operation the reaction gases comprising a mixture of air or oxygen and methanol vapor are supplied to the converter through inlet 11 and pass downwardly through the catalyst tubes 19 to lower chamber 14 and thence pass from the chamber through the exit 13 for further treatment to produce 37% formaldehyde, as set forth in the aforesaid applications Serial Nos. 452,684 and 452,685.

Dowtherm liquid is supplied to the chamber 20 surrounding the catalyst tubes 19 through inlet 21 by means of pump 24. The temperature may be suitably regulated by means of the heater 28 and control valves 25, 29 and 30. Dowtherm vapor from the chamber 20 passes through the exit 35 and pipe 36 through diaphragm valve 42 which is operated by pressure changes controlled by the instrument 43, the valve opening automatically on air failure. From the diaphragm valve 42 the vapor passes to the condenser 40 from which the condensed liquid is returned through return lines 41 and 32$^a$ to pump 24. The line 31 and valve 32 leading from the lower exit 22 from chamber 20 may be provided for subcooling of vapor by increasing the flow through the condenser. This action, however, is optional. In the event of an emergency it is desirable to cool the Dowtherm rapidly from the high operating temperatures (up to 700° F.) to below 250° F. As a design factor the quantity of water in the condenser is sufficient to cool the Dowtherm from 700° to 250° F. without additional water being added.

As will be apparent from the foregoing description, heat is removed from the catalyst bed by vaporization of the Dowtherm fluid from outside the catalyst tubes, and the boiling point of the Dowtherm fluid may be regulated between 400° F. and 700° F. by adjusting its pressure by changing the flow rate of Dowtherm vapor fluid through the diaphragm valve 42.

Among the advantages of the system may be mentioned the following:

(1) Accurate control over the entire operating range (Dowtherm temperature of 400° to 700° F.).

(2) Simplicity and low cost of installation.

(3) Automatic operation with provision for safe manual operation in an emergency.

(4) A high degree of safety, the vapor being cooled rapidly in case of power or air failure, and the water in the condenser being sufficient to cool all Dowtherm fluid without adding more water.

In accordance with our specific embodiment of the invention the diaphragm valve 42 is a four-inch Fisher type 555T diaphragm spring-controlled back pressure regulator. The instrument designated 43 is a Fisher type 4100 U-pilot control instrument, steel Bourden tube, and the controller designated 51 is a McDonnell #150 liquid level pump control valve.

The invention has been described in detail for the purpose of illustration but it will be obvious that numerous modifications and variations may be resorted to without departing from the spirit of the invention.

We claim:

1. In a process for controlling the reaction temperature of the exothermic vapor-phase catalytic oxidation of alcohols to aldehydes, wherein an oxygen containing gas and an alcohol are continuously passed through tubes containing catalyst within a reactor, the improvement which comprises controlling the temperature of the catalyst tubes by continuously maintaining a vaporizable liquid phase heat exchange medium in liquid phase heat transfer relation to said tubes, removing a portion of the heat exchange medium from the lower portion of the reactor in liquid phase and returning the same to the upper portion of the reactor in a closed circulating system, continuously removing any vapor from said circulating medium within the reactor through a conduit separate from the circulation system to a condensing zone removed from said reactor, condensing said vapor in said condensing zone, separately returning the liquid to said circulation system without contacting the vapor passing from the reactor to the condensing zone, and maintaining the heat exchange medium in liquid phase while in contact with said catalyst tubes by passing the vapors from the reactor heat exchange medium through a pressure control valve prior to entering the condensing zone.

2. A process as set forth in claim 1, wherein the heat exchange medium is Dowtherm.

References Cited in the file of this patent

UNITED STATES PATENTS

| | | |
|---|---|---|
| 142,534 | Trowbridge | Sept. 2, 1873 |
| 1,317,262 | Bajda | Sept. 30, 1919 |
| 1,604,739 | Downs | Oct. 26, 1926 |
| 1,671,761 | Copeman | May 29, 1928 |
| 1,929,520 | Rudorff | Oct. 10, 1933 |
| 2,064,317 | Oxley et al. | Dec. 15, 1936 |
| 2,081,120 | Reynolds | May 18, 1937 |
| 2,355,938 | Wroby | Aug. 15, 1944 |
| 2,471,476 | Benning | May 31, 1949 |
| 2,582,134 | Kimmell | Jan. 8, 1952 |